April 26, 1960

W. A. EATON 2,934,178

LIQUID COOLED BRAKE MECHANISM

Filed Feb. 28, 1957

INVENTOR
WILFRED A. EATON

BY *Scrivener & Parker*

ATTORNEY

April 26, 1960  W. A. EATON  2,934,178
LIQUID COOLED BRAKE MECHANISM
Filed Feb. 28, 1957  3 Sheets-Sheet 2
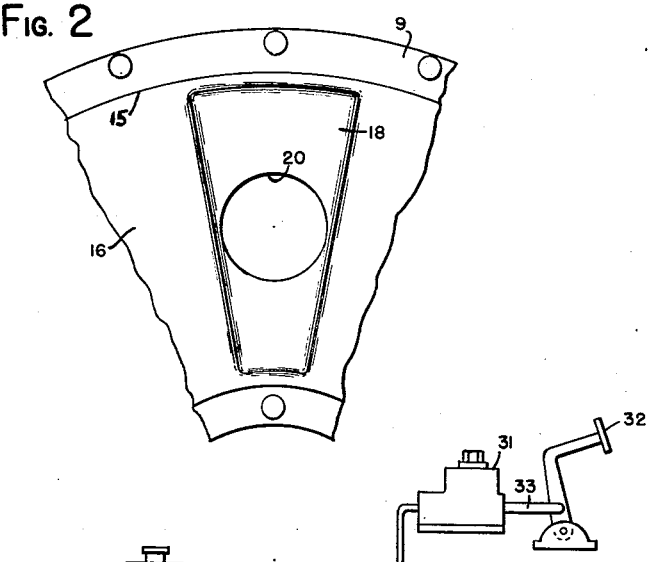
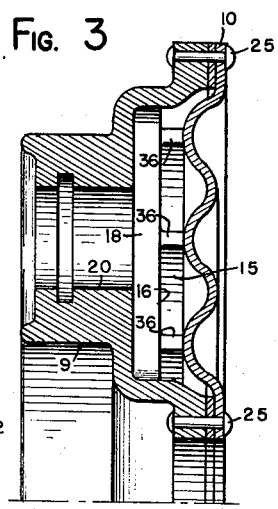
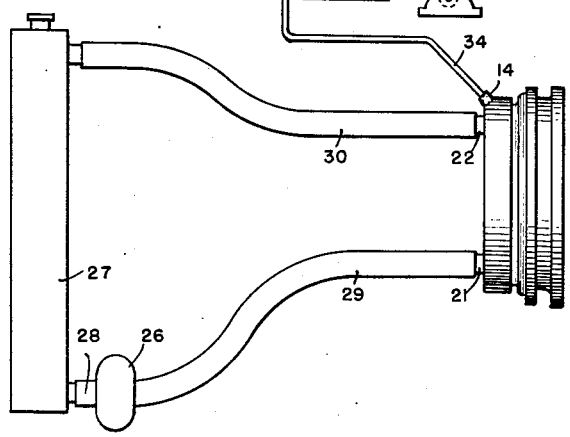
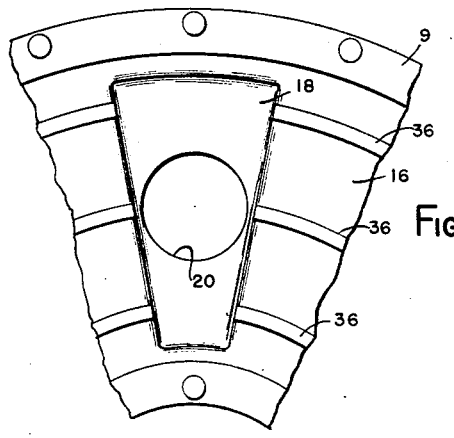
INVENTOR
WILFRED A. EATON
BY Scrivener & Parker
ATTORNEY April 26, 1960 W. A. EATON 2,934,178
LIQUID COOLED BRAKE MECHANISM
Filed Feb. 28, 1957 3 Sheets-Sheet 3
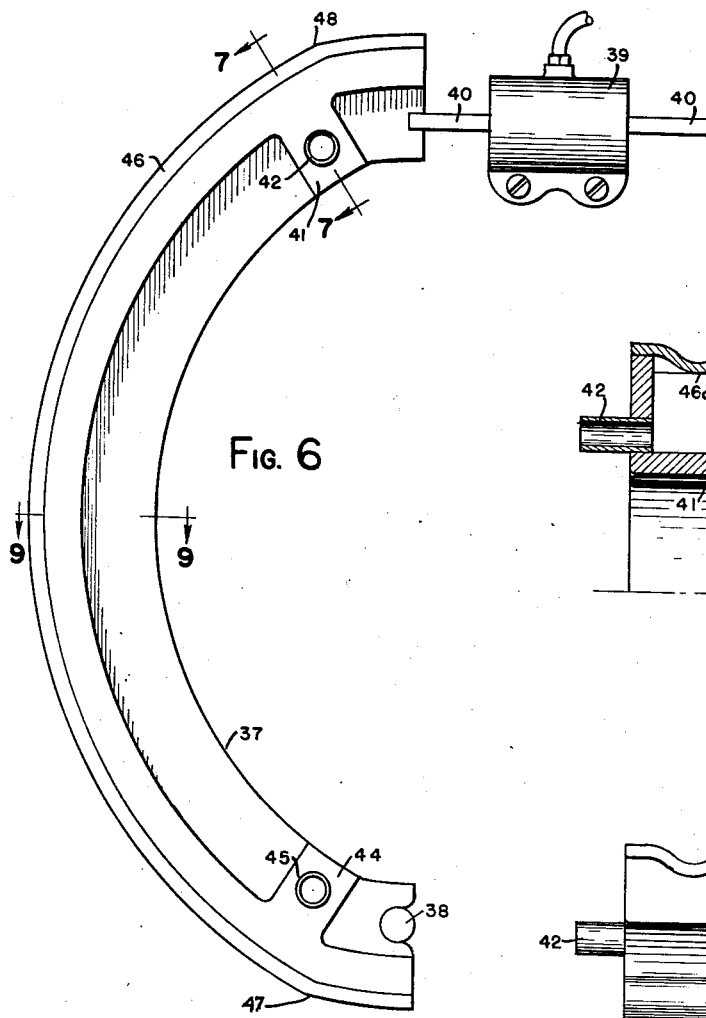
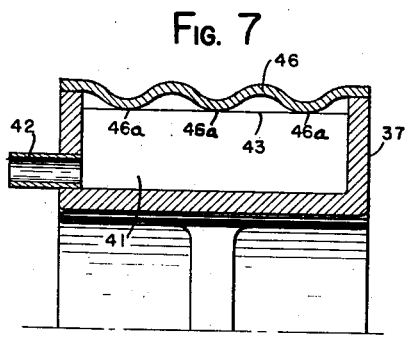
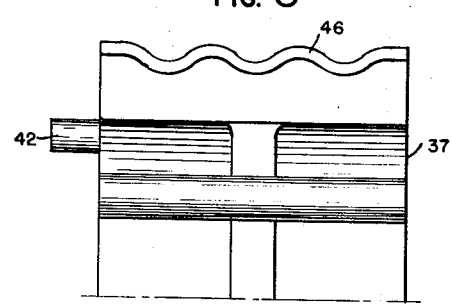
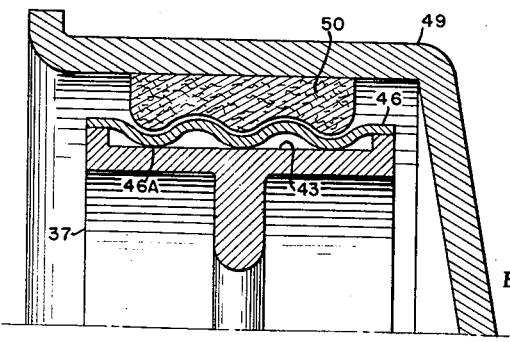
INVENTOR
WILFRED A. EATON
BY Scrivener & Parker
ATTORNEY

United States Patent Office 2,934,178
Patented Apr. 26, 1960

2,934,178
LIQUID COOLED BRAKE MECHANISM

Wilfred A. Eaton, North Woodbury, Conn., assignor to Roy S. Sanford, Wilfred A. Eaton, and Erling D. Sedergren, all of Woodbury, and Roger H. Casler and James O. Eames, both of Washington, Conn.

Application February 28, 1957, Serial No. 643,178

11 Claims. (Cl. 188—264)

This invention relates to frictional mechanisms such as brakes and clutches, hereinafter generally referred to as brake mechanisms, and more particularly to brake mechanisms of the liquid cooled type.

The excessive heat developed during the operation of brake mechanisms has caused great difficulty in the past, and it has been found that in the event a relatively thin metal friction element can be utilized, adapted to engage a brake lining on one side, and adapted to be engaged by a circulating cooling liquid on the other side, these difficulties can be largely overcome. Copper was found to be particularly desirable metal for the friction element due to its excellent friction characteristics and wear characteristics when utilized with suitable composition linings, but due to the inherent lack of strength of this metal, it has been found difficult to properly support such a friction element so as to prevent distortion during the braking operation. Although as stated above, the copper is particularly adapted to this type of service, it will be understood that other metals are contemplated, and that the invention has for one of its objects the provision of means for supporting a thin metallic friction element of copper or other metal against distortion, while at the same time permitting the surface of the element opposite that which engages the friction lining to be cooled directly by a circulating cooling liquid.

Another object of the invention is the provision of a novel brake shoe of the liquid cooled type.

Still another object of the invention is the provision of a brake mechanism of the liquid cooled type, wherein the engaging areas of the friction elements are relatively large for a given diameter of the brake mechanism.

Yet another object of the invention is to provide a metallic friction element for a brake of the above type, so constituted as to be inherently strengthened against distortion due to its shape and construction.

These and other novel features and objects of the invention will be more readily apparent from the following detailed description when taken in connection with the accompanying drawings. It is to be expressly understood, however, that the description and drawings are not to be taken as defining the limits of the invention, reference being had for this purpose to the appended claims.

In the drawings, Fig. 1 is a sectional view of a brake mechanism embodying the principles of the invention;

Fig. 2 is a partial view of one of the members of Fig. 1 taken from the right;

Fig. 3 is a partial sectional view of a modified form of the brake mechanism shown in Fig. 1;

Fig. 4 is a partial view taken from the right of the mechanism shown in Fig. 3;

Fig. 5 is a diagrammatic view of a brake system embodying the brake mechanism of the invention;

Fig. 6 is a view of another form of brake mechnism embodying the principles of the invention;

Fig. 7 is a sectional view of the mechanism of Fig. 6 taken along lines 7—7;

Fig. 8 is an end view of the upper end of the brake shoe shown in Fig. 6, and

Fig. 9 is a sectional view of the brake shoe shown in Fig. 6 taken along lines 9—9.

Figure 1:
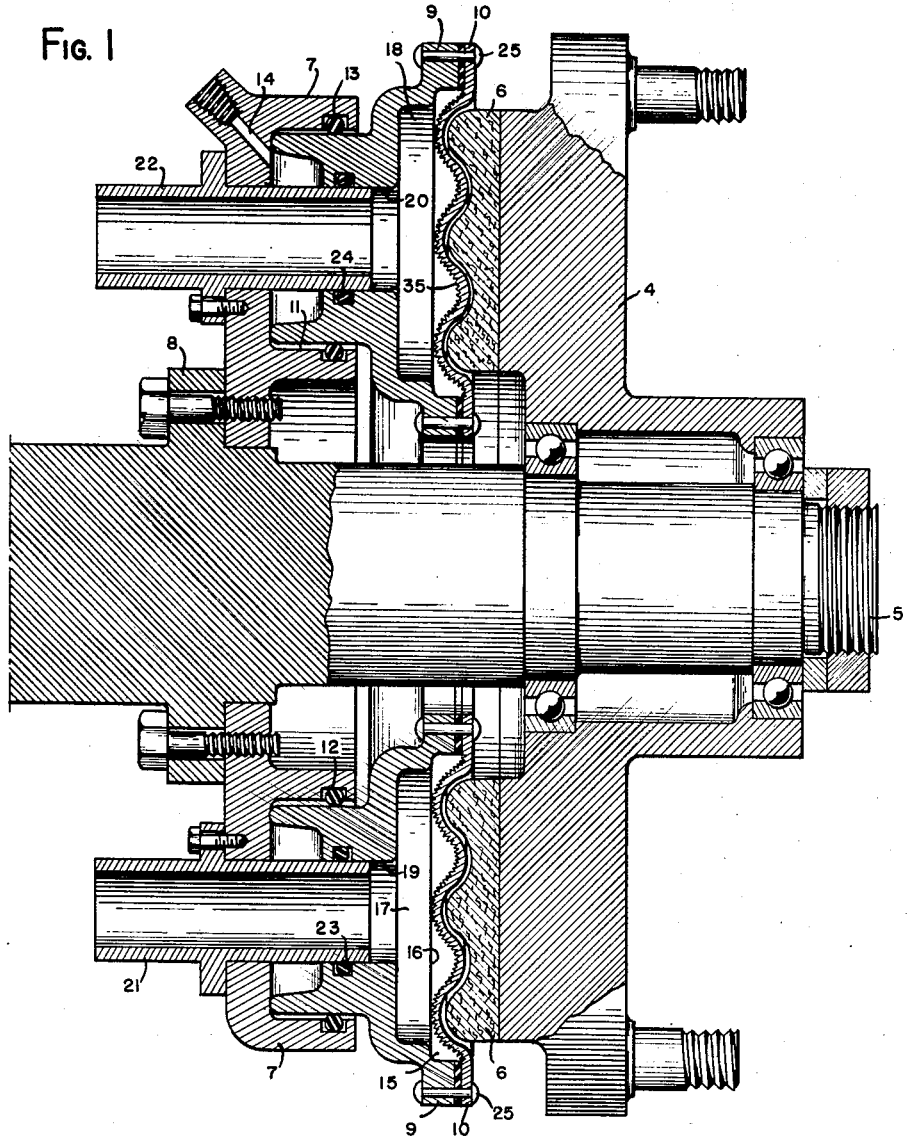

Referring first to Fig. 1, a simplified form of disc brake mechanism is shown which includes in general a wheel 4 rotatably mounted on an axle 5, and having an annular brake lining ring 6, preferably of substantially non-metallic composition material, secured to its left face in any suitable manner, an annular cylinder member 7 secured to a stationary axle housing 8, an annular piston 9 slidably mounted in the cylinder 7, and a relatively thin metallic friction element 10 secured to the right end of the piston, as will be more fully described hereinafter.

The cylinder member is provided with a bore 11, and the piston 9 is slidably mounted therein, the bore being provided with inner and outer annular sealing rings 12 and 13 of the O ring type in order to prevent leakage from the cylinder by the piston. The cylinder is provided with a port 14 which is adapted to be connected to a suitable source of fluid pressure such as a conventional hydraulic master cylinder, it being understood that when fluid pressure is supplied to the cylinder through the port, the piston is forced to the right to effect a brake application.

The piston is provided with an open ended annular channel 15, as best shown in Fig. 1 and Fig. 2, this channel having a back wall or floor 16 extending entirely around the channel except for inlet and outlet plenum chambers 17 and 18, which may be shaped as shown at 18 in Fig. 2. Inlet and outlet ports 19 and 20 are formed in the piston in registry with chambers 17 and 18 respectively, and inlet and outlet conduits 21 and 22 are secured to the cylinder member 7 as shown, the right ends of these conduits extending respectively through the ports 19 and 20 in the piston in sliding engagement therewith. These are sealed against leakage by means of suitable O rings 23 and 24.

As shown in the drawing, the thin metallic friction element 10 is provided with concentric corrugations, the inner and outer peripheral portions of the element being secured to the right end of the piston in sealing engagement therewith by suitable rivets 25. The corrugations are so shaped that alternate peaks on the inner side of the element rest directly on the floor 16 of the piston channel, it being understood that this contact is tangential, and that the contact is therefore substantially a line contact and covers a very small area of the friction element. Thus, these alternate corrugations are directly supported by the floor of the piston channel. These corrugations serve to materially strengthen the friction element against distortion, and when this strengthening action is taken in connection with the support of the alternate corrugations on the floor of the piston channel, it will be understood that distortion of the metallic friction element is substantially prevented during all normal conditions of the brake operation.

The brake lining 6 is molded or shaped to conform to the contour of the corrugations on the metallic friction element, and serves to increase the braking area for a given brake diameter. At the same time, due to the fact that the corrugations are modified V grooves, a certain amount of self energization occurs which allows a smaller brake to be utilized in some cases than would be required with a more conventional type brake. With this construction the metallic friction element may be made of uniform thickness throughout in order to provide uniform heat transfer to the liquid in the piston channel, and due to the line contact of the alternate corrugations with the floor of the piston, substantially the entire area of the surface opposite the friction surface of the element is directly engageable by the cooling liquid in the piston channel.

As shown in Fig. 5, a circulating pump 26 is provided, which may be driven by the vehicle engine or otherwise as desired, the inlet of this pump being connected to the lower part of a radiator or heat exchanger 27 by means of a conduit 28, and the discharge port of pump being connected to the inlet conduit 21 of the brake through conduit 29. The outlet conduit 22 of the brake is connected to the upper end of the radiator by a conduit 30. In the embodiment shown, the brake may be operated by a suitable conventional hydraulic master cylinder 31 having a piston, not shown, connected to a brake pedal 32 by means of a rod 33.

The master cylinder is connected to port 14 of the brake cylinder by a conduit 34, and it will be apparent that on depression of the brake pedal, the piston of the brake will be moved to the right to effect frictional engagement of the metallic friction element with the friction ring on the wheel. At the same time, cooling liquid from the radiator is circulated continuously through the channel 15 in direct engagement with substantially the entire left surface of the thin corrugated friction element 10, the liquid entering in the valleys of the corrugation through the port 19 and the chamber 17, circulating in both directions around the piston channel, and being discharged through the chamber 18 and the port 20 in the piston and thence back to the radiator as described. Thus, with the exception of those portions of the metallic friction element which have line contact with the floor of the piston channel, the entire surface of the metallic friction element directly opposite that surface which engages the friction ring 6 is directly cooled by a circulating cooling liquid. In addition, the corrugations tend to stiffen the metallic friction element, the alternate peaks of the corrugations on the left surface of the friction element are supported mechanically by the piston, and the only unsupported portions are those which are directly opposite the chambers 17 and 18, it being noted that the unsupported portions are so small as to be negligible. The metallic friction element is readily adapted for production, since it can be easily formed in a press to the shape desired. In the event, the most efficient heat transfer is desired, the left surface of the metallic friction element may, as shown in Fig. 1, be provided with a plurality of concentric adjacent V shaped grooves 35, which materially increase the area in contact with the cooling liquid as compared to the area which contacts the brake friction ring 6.

In the event a larger channel for cooling liquid is desired, the piston and the metallic friction element may be constructed as shown in Fig. 3. In this embodiment of the invention, the piston is again provided with plenum chambers 17 and 18, the latter only being shown, and the floor or back wall 16 of the piston channel is spaced further from the alternate peaks of the inner corrugations in the metallic friction element and is provided with concentric ribs 36, the right faces of which engage the alternate peaks of the corrugations of metallic friction element on the left surface of the element. It will be seen from the above, that the element is as fully supported mechanically as was the case in the construction shown in Fig. 1, but that due to the utilization of the thin ribs 36 to support the friction element, the cross-sectional area of the water passage in the piston channel is materially increased, so that a larger volume of cooling liquid is available for the absorption of heat from the friction element. Although not shown, it will also be understood that if desired, the ribs 36 may be so spaced as to engage alternate valleys in the left face of the metallic friction element rather than the peaks of the corrugations. In either case, the ribs will serve to adequately support the metallic friction element against distortion. As a further modification, ribs similar to the ribs 36 may be provided in the construction shown in Fig. 1 to engage the valleys of the alternate corrugations in order to provide a more complete support of the metallic friction element.

It will be understood that these modifications may suggest themselves to those skilled in the art, and that they are considered to embody the principles of the invention as shown and described.

Fig. 4 is a view taken from the right in Fig. 3, and shows clearly the arrangement of the plenum chamber 18, the outlet port 20, and the supporting ribs 36 which extend outward from the floor 16 of the piston. A corresponding plenum chamber 17 and inlet port 19 is provided in the construction of Figs. 3 and 4, being spaced approximately 180° from the plenum chamber 18 and the outlet port 20.

The principles of the invention are also applicable to brakes of the so-called shoe and drum type, and Figs. 6 to 9 inclusive show the application of such principles to a brake of that type. Referring first to Fig. 6, we have a brake shoe 37 supported at one end by a suitable anchor pin 38, and connected at the other end to a hydraulic brake actuating cylinder 39 by means of a push rod 40, it being understood that a second brake shoe 37, not shown, is provided and operated by the hydraulic actuating cylinder in the usual manner. As shown in Fig. 7, the brake shoe is provided adjacent the upper end with a plenum chamber 41 having an outlet conduit 42. The brake shoe is provided with a platform or floor 43 which extends around the brake shoe from the plenum chamber 41 to a similar plenum chamber 44 at the lower end of the brake shoe, this latter plenum chamber being provided with an inlet conduit 45.

A corrugated metal friction element 46, preferably of copper, is formed in arcuate shape to conform to the arc of the brake shoe, and the inner alternate peaks of the corrugations are so shaped and dimensioned as to rest on the floor or platform 43 of the brake shoe, these peaks thus being supported thereby. The right and left edges of the friction element are secured in sealing engagement to brake shoe by silver solder, brazing, welding, or by other suitable means. The arc of contact of the brake shoe in the embodiment shown extends from region 47 to region 48, the body of the brake shoe to the right of region 47 extending inwardly of a circle circumscribing the main arcuate portion of the shoe, and the portion of the shoe at the right of region 48 extending inwardly of said circle in like manner. The portions of the shoe extending from the region 47 to the right end and from the region 48 to the right end are grooved or corrugated as shown in Fig. 8 to conform to corrugations in the end portions of the metallic friction element 46, these friction element portions likewise extending inwardly of the circle circumscribing the braking portion of the element at the right of the region 47 as well as at the right of region 48. The portion of the metallic friction element which conforms to the corrugated end portions of the shoe is likewise secured thereto in sealing engagement as above stated in connection with the right and left edges of the shoe, so that the entire periphery of the friction element is secured to the shoe in sealing engagement.

A brake drum 49, which may be of conventional construction, is suitably mounted on the axle of the vehicle, not shown, and is provided with an internal lining of friction material having its inner surface shaped to conform to the corrugations on the metallic friction element 46. It will be seen from the foregoing that the valleys of the corrugations on the inner surface of the friction element provide passages for liquid extending from the plenum chamber 44 to the plenum chamber 41, and that when circulating liquid is supplied to the inlet conduit 45, it passes through the valleys in the friction element and in contact with the inner surface thereof to the plenum chamber 41 and thence outward through the outlet conduit 42. Referring back to Fig. 5, it will be understood that the liquid conduit 29 may be connected to the inlet conduit 45 of the brake shoe, and that the conduit 30 may be connected to the outlet conduit 42 of the brake shoe, thus providing for a circulation of the cooling liquid through the brake shoe by the operation of circulating pump 26.

The only portions of the peaks of the corrugations which are unsupported directly by the platform 43 of the brake shoe are those which pass over the open outer ends of the plenum chambers, and it will be understood that this distance is very short and does not result in weakening the structure to the extent that will cause the metallic friction element to be distorted in these regions. The ends of the brake shoe are purposely relieved as above stated to the right of the points 47 and 48, in order to prevent engagement of the metallic friction element in these regions with the brake lining 50, it being understood that these portions are supported directly by the metal of the brake shoe structure, and are not directly cooled by the cooling liquid. Consequently, the construction is such that substantially all of the working surface of the metallic friction element is directly cooled on its opposite side by the cooling liquid. The peaks of the corrugations have substantially line contact with the surface of the platform 43, and consequently there are no appreciable hot spots which may develop on the metallic friction element.

There is thus provided by the present invention, means for utilizing a relatively thin metallic friction element of substantially uniform thickness, substantially the entire inner surface of which may be directly cooled by a circulating liquid in order to most efficiently dissipate the heat developed during the brake application between the friction element and the friction lining on the wheel. This is accomplished without complicated forming of the metallic friction element, and in addition, the shape and construction of the friction element is such that the mere formation of the element in accordance with the principles of the invention assists in strengthening the element and preventing distortion.. The friction elements may be readily formed by well known conventional methods, and thus provide a construction which may be economically utilized in connection with brake mechanisms. Although described primarily in connection with brake mechanisms, it will be understood that the same principles apply to liquid cooled clutches and frictional devices of various sorts.

The feature of the construction which permits the use of a metallic friction element of substantially uniform thickness is very advantageous since it serves to prevent the formation of hot spots which would occur if ribs were formed directly on the inner surface of the element for supporting the same. Although one form of corrugation has been shown, it will be apparent that these corrugations may take other shapes without departing from the spirit of the invention. In like manner, more corrugations or fewer corrugations may be utilized depending on the size of the parts and on the degree of support required. In the event a very soft metal such as copper is utilized, more corrugations may be required than in a stronger metal such as steel. The ribs 36, shown in Figs. 3 and 4 have been generally indicated as being continuous, but it will also be understood that these may be discontinuous if desired in order to provide circulation of the cooling liquid between the channels formed by the ribs.

From the foregoing, it will be apparent that the invention is not to be considered as limited to the specific forms illustrated and described, but may well be embodied in other equivalent forms within the scope of the appended claims, as will suggest themselves to those skilled in the art. Reference is had to the appended claims for a definition of the limits of the invention.

What is claimed is:

1. A liquid cooled brake mechanism including a movable brake shoe member having a supporting platform portion, a corrugated metal friction element of substantially uniform metal thickness secured along the periphery thereof to the shoe member in sealing engagement therewith, one side of the element forming a friction surface and the peaks of the corrugations on the other side of the element being in engagement with and supported by said platform portion, the valleys of said corrugations on said other side of the element forming, in conjunction with said platform portion, passages for cooling liquid, spaced inlet and outlet plenum chambers communicating with said passages for the admission and discharge of cooling liquid, a rotatable element, and a composition friction lining member secured thereto adjacent said corrugated metal element, said lining member having a surface contoured for substantially uniform mating engagement with the corrugated surface of said metal friction element on said one side thereof.

2. A liquid cooled brake mechanism including a radially movable arcuate brake shoe member having an arcuate supporting platform portion, an arcuate corrugated metal friction element of substantially uniform thickness secured along the periphery thereof to the brake shoe member in sealing engagement therewith, the corrugations extending longitudinally of the shoe member, one side of the element forming a friction surface and the peaks of the corrugations on the other side of the element being in engagement with and supported by said platform portion, the valleys of said corrugations on said other side forming, in conjunction with said platform portion, passages for cooling liquid, spaced inlet and outlet plenum chambers communicating with said passages for the admission and discharge of cooling liquid, a rotatable brake drum having a cylindrical surface adjacent said brake shoe friction element, and a composition friction lining secured to said drum surface having a friction surface adapted for engagement by said friction element on radial movement of said shoe member, said friction surface of the lining being contoured for substantially uniform mating engagement with the corrugated surface of said metal friction element on said one side thereof.

3. A liquid cooled brake shoe including a movable brake shoe member, a corrugated metal friction element of substantially uniform thickness secured along the peripheral portions thereof to the member in sealing engagement therewith, one side of said element forming a friction surface, means for supporting said element comprising ribs on said member in supporting engagement with alternate corrugations on the other side of said element, said member, ribs and corrugations defining passages for cooling liquid adjacent said other side of said element, and spaced inlet and outlet plenum chambers in said member for the admission and discharge of cooling liquid, said plenum chambers communicating with said passages.

4. A liquid cooled brake shoe including a movable annular brake shoe member having an annular channel for cooling liquid formed in one end thereof and having a back wall, spaced apart inlet and outlet plenum chambers in said member communicating with said channel for the admission and discharge of cooling liquid, and an annular metal friction element of substantially uniform thickness having concentric corrugations formed therein, said element being secured along the peripheral portions thereof to said one end of the member in sealing engagement therewith and forming an end wall for said channel, and the peaks of the corrugations on the inner side of said element being in supporting engagement with the back wall of said channel, the valleys of said corrugations and said channel defining passages for cooling liquid extending between said plenum chambers.

5. A liquid cooled brake shoe including a movable annular brake shoe member having an annular channel for cooling liquid formed in one end thereof and having a back wall with concentric ribs formed thereon, spaced apart inlet and outlet plenum chambers in said member communicating with said channel for the admission and discharge of cooling liquid, and an annular metal friction element of substantially uniform thickness having concentric corrugations formed therein, said element being secured along the peripheral portions thereof to said one end of the member in sealing engagement therewith and forming an end wall for said channel, and the peaks of the corrugations in said element being in supporting engagement with said ribs, said channel, ribs, and corrugations defining passages for cooling liquid extending between said plenum chambers.

6. A liquid cooled brake shoe including a movable brake shoe member, a corrugated metal friction element of substantially uniform thickness secured along the peripheral portions thereof to the member in sealing engagement therewith, the outer side of said element forming a friction surface adapted for frictional engagement with a composition friction element contoured for mating engagement with the outer side of the element, a corrugated portion of the other side of the element being in substantially line contact with the member for supporting the element against distortion inwardly, the corrugated portion of said other side of the element forming, in conjunction with said member, passages for cooling liquid, and spaced inlet and outlet ports in said member for the admission of cooling liquid to the passages and the discharge of cooling liquid therefrom.

7. Liquid cooled brake mechanism including a movable brake shoe member, a metal friction element secured along the peripheral portions thereof to the member in sealing engagement therewith and having parallel corrugations formed therein, said corrugations being supported on the inner side of the element by engagement with the member and forming, in conjunction therewith, parallel passages for cooling liquid, means for supplying cooling liquid to said passages and for discharging cooling liquid therefrom, a rotatable member, and a friction lining carried by said member, said lining having parallel corrugations formed on one surface thereof contoured for mating engagement with the outer surface of said element on movement of said brake shoe member to effect a brake application.

8. A liquid cooled brake shoe comprising a movable brake shoe member, a corrugated metal friction element secured along the peripheral portions thereof to the member in sealing engagement therewith and forming, in connection with the member, a chamber for cooling liquid, portions of the corrugated inner surface of the element being in engagement with and supported by said member against distortion inwardly, and means for supplying cooling liquid to the cooling liquid chamber and for discharging liquid therefrom.

9. A liquid cooled brake shoe including a movable brake shoe member having an arcuate central portion and end portions at either end thereof, a corrugated metal friction element having an arcuate central friction engaging portion and end portions at either end thereof, said element being secured to the shoe member in sealing engagement therewith, the longitudinal edge portions of the element being secured to the longitudinal edge portions of the shoe member and said end portions of the element being secured to the corresponding end portions of the shoe member, said member and element forming therebetween an arcuate cooling liquid chamber substantially coextensive with said central arcuate portions of the shoe member and element and the member being in supporting engagement with the corrugations in said central arcuate friction engaging portion of said element, said end portions being formed to provide relieved portions at either end of the arcuate central friction engaging portion of the element whereby frictional engagement of said end portions is prevented, and means for admitting cooling liquid to said arcuate chamber at one end and for discharging cooling liquid from the chamber at the other end.

10. Liquid cooled brake mechanism including a rotatable brake lining member having a corrugated friction surface formed thereon, and a movable liquid cooled brake shoe mounted adjacent said lining member, said brake shoe including a brake shoe member having an arcuate central portion and end portions at either end of the central portion, a metal friction element having an arcuate central portion and end portions at either end thereof, said element being secured to the shoe member in sealing engagement therewith and forming an arcuate chamber for cooling liquid therebetween substantially coextensive with the arcuate portions of the shoe member and element, said arcuate central portion of the element being corrugated for mating engagement with the corrugated friction surface of the lining member on brake applying movement of the brake shoe, and means for supplying cooling liquid to said arcuate chamber at one end and for discharging cooling liquid at the other end thereof, said shoe member being in supporting engagement with the corrugations of said element on the inner side thereof, and the end portions of the shoe member and element being so shaped as to substantially limit engagement of the element with the lining member to said arcuate central portion of the element.

11. Liquid-cooled brake mechanism including a pair of brake friction members mounted for relative rotation and for relative movement into frictional engagement, one of said members including a supporting platform portion and a corrugated metal friction element of substantially uniform thickness secured to the member in sealing engagement and forming a chamber for cooling liquid therebetween, said platform portion being in supporting engagement with the corrugations on the inner surface of said metal element and supporting the latter against distortion, and a composition friction lining element on the other of said members having a friction surface contoured for substantially uniform mating engagement with the outer corrugated surface of said metal friction element on relative engaging movement of said members.

References Cited in the file of this patent

UNITED STATES PATENTS

| | | |
|---|---|---|
| 466,275 | Fasoldt | Dec. 29, 1891 |
| 795,974 | Hele-Shaw | Aug. 1, 1905 |
| 1,628,492 | Dobrowolski et al. | May 10, 1927 |
| 2,051,286 | Boykin | Aug. 18, 1936 |
| 2,381,393 | Brown | Aug. 7, 1945 |
| 2,719,620 | McDonald | Oct. 4, 1955 |
| 2,747,702 | Van Zelm | May 29, 1956 |
| 2,770,442 | Demay | Nov. 13, 1956 |

FOREIGN PATENTS

| | | |
|---|---|---|
| 802,800 | France | June 22, 1932 |
| 546,215 | Great Britain | July 2, 1942 |
| 896,915 | Germany | Nov. 16, 1953 |